(12) United States Patent
Heidan

(10) Patent No.: US 8,939,499 B2
(45) Date of Patent: Jan. 27, 2015

(54) DRIVE SYSTEM FOR A SLIDING ROOF OR A WINDOW OPENER

(75) Inventor: Michael Heidan, Stuttgart (DE)

(73) Assignee: BOS GmbH Co. KG, Ostfildern (DE)

( * ) Notice: Subject to any disclaimer, the term of this patent is extended or adjusted under 35 U.S.C. 154(b) by 0 days.

(21) Appl. No.: 13/880,557

(22) PCT Filed: Oct. 19, 2011

(86) PCT No.: PCT/EP2011/068232
§ 371 (c)(1),
(2), (4) Date: Jun. 24, 2013

(87) PCT Pub. No.: WO2012/052464
PCT Pub. Date: Apr. 26, 2012

(65) Prior Publication Data
US 2013/0276560 A1    Oct. 24, 2013

(30) Foreign Application Priority Data

Oct. 19, 2010 (DE) .......................... 10 2010 048 723
Oct. 20, 2010 (DE) .......................... 10 2010 048 803
Dec. 29, 2010 (DE) .......................... 10 2010 056 374

(51) Int. Cl.
*B60J 7/057*    (2006.01)
*B60J 7/02*    (2006.01)

(52) U.S. Cl.
CPC . *B60J 7/0573* (2013.01); *B60J 7/02* (2013.01)
USPC ....... 296/223; 296/214; 296/216.08; 296/224

(58) Field of Classification Search
CPC .................................. B60J 7/02; B60J 7/0573
USPC .............................. 296/223, 216.08, 224, 214
See application file for complete search history.

(56) References Cited

U.S. PATENT DOCUMENTS 5,335,961 A * 8/1994 Reinsch et al. ............... 296/213
5,484,185 A * 1/1996 Salz et al. ................ 296/220.01
(Continued)

FOREIGN PATENT DOCUMENTS

DE    199 44 853 C1    12/2000
DE    101 46 285 A1    10/2002
(Continued)

OTHER PUBLICATIONS

Office Action of German Patent Office issued in German Application No. 10 2011 084 772.3 dated Jul. 19, 2012 (8 pages).
(Continued)

*Primary Examiner* — Dennis H Pedder
(74) *Attorney, Agent, or Firm* — Flynn, Thiel, Boutell & Tanis, P.C.

(57) ABSTRACT

A drive unit for a motor vehicle having a guide element, a function unit guided by the guide element and which is movable via a motor, and a carrier guided by the guide element and coupled to the function unit. The carrier includes a coupling element movable relative to a main body of the carrier, so that to bring about an engaged state the coupling element is arranged in a first position inside a receptacle of the guide element to fix the carrier on the guide element, and to bring about a coupled state the carrier is arranged in a second position inside a recess of the function unit so that the carrier is moved together with the function unit. The carrier has a securing element movable relative to the main body and which, in a fixing position, prevents movement of the coupling element out of the first position.

14 Claims, 4 Drawing Sheets

(56) References Cited

U.S. PATENT DOCUMENTS

| | | | |
|---|---|---|---|
| 2001/0026085 A1* | 10/2001 | Farmont et al. | 296/223 |
| 2002/0041113 A1 | 4/2002 | Hori et al. | |
| 2004/0080189 A1* | 4/2004 | Schatzler et al. | 296/214 |

FOREIGN PATENT DOCUMENTS

| | | |
|---|---|---|
| DE | 20 2007 001 217 U1 | 5/2007 |
| DE | 10 2006 037 787 A1 | 4/2008 |
| DE | 20 2008 007 383 U1 | 10/2008 |
| DE | 10 2009 041 903 B3 | 3/2011 |

OTHER PUBLICATIONS

Form PCT/ISA/210 International Search Report with English translation of categories of documents cited dated Dec. 6, 2011 (4 pages).

Form PCT/ISA/237 Written Opinion of International Searching Authority dated Dec. 6, 2011 (5 pages).

* cited by examiner

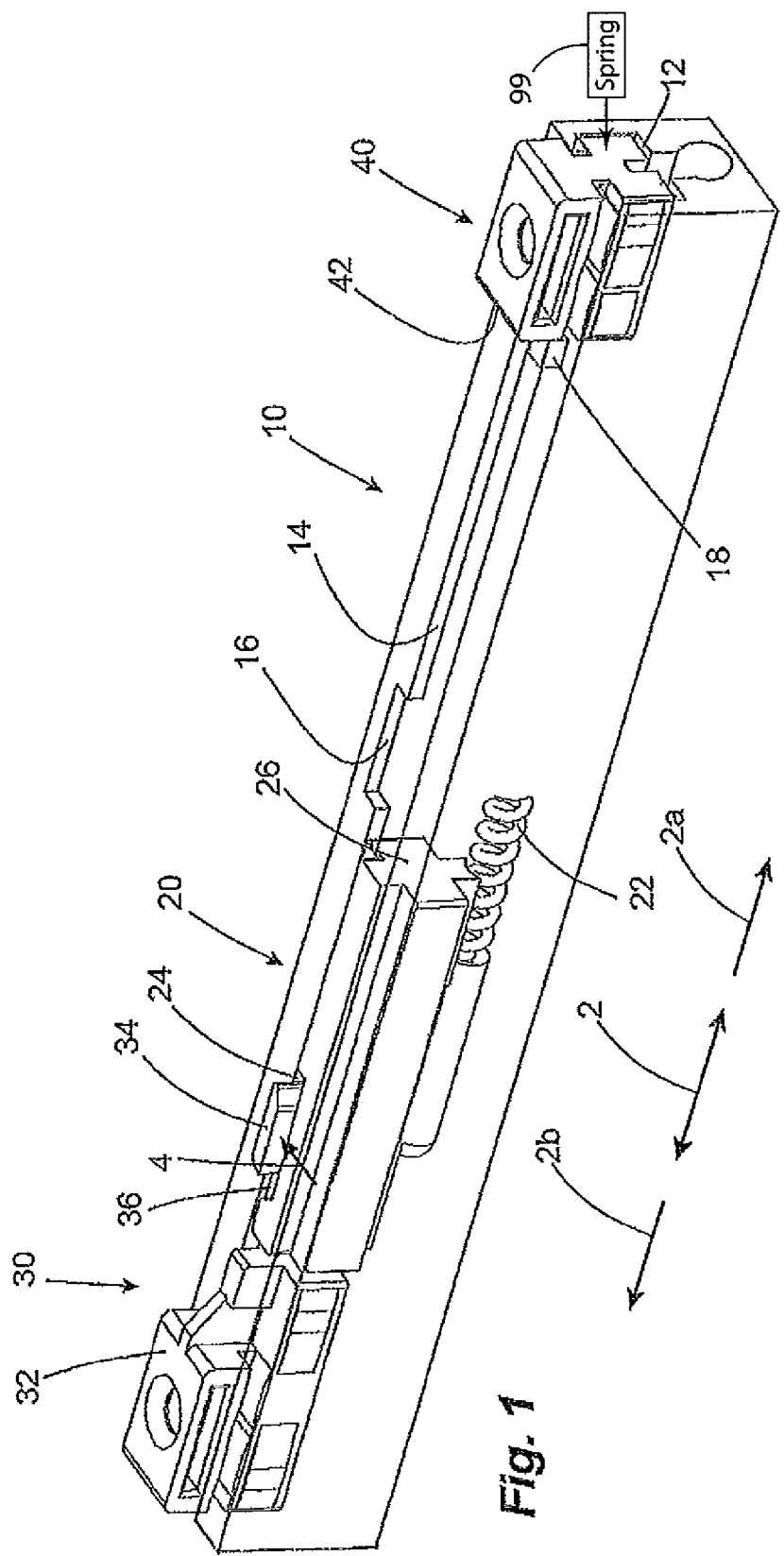

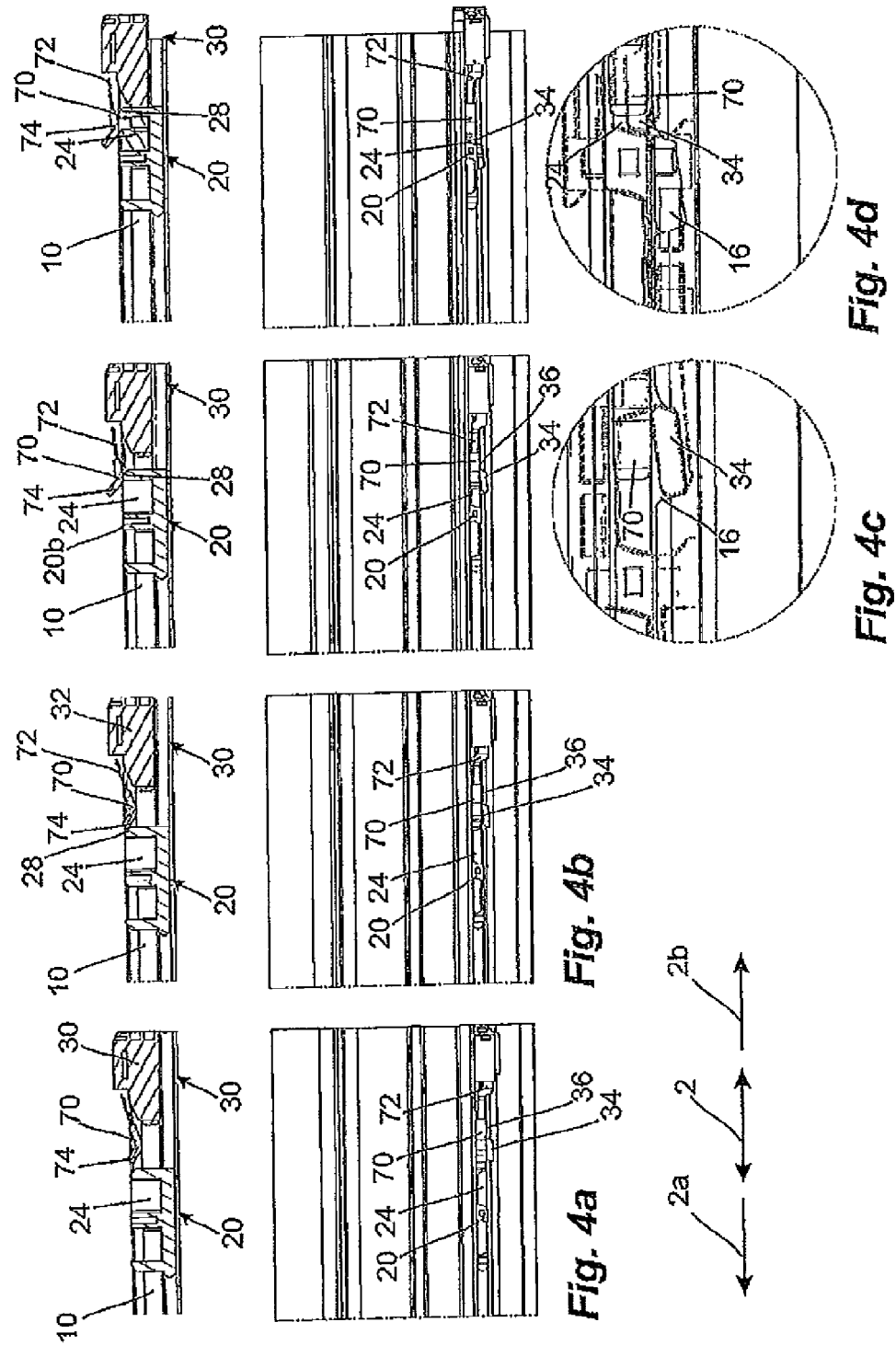

DRIVE SYSTEM FOR A SLIDING ROOF OR A WINDOW OPENER

FIELD OF APPLICATION AND PRIOR ART

The invention relates to a drive unit for a covering system of a motor vehicle, in particular for a sliding roof or a window opener of a motor vehicle, having a guide element, a function unit that is guided by the guide element and movable by means of a motor, and a carrier that is guided by the guide element and which can be coupled to the function unit.

The invention further relates to a system, in particular to a roof system or a window opening system having such a drive unit, and to a motor vehicle having such a system.

A generic drive unit serves to enable movement of components in connection with a window system, a roof system or a shading system of a motor vehicle, for example a roller blind system. For this purpose, it has a guide element, where in connection with the present invention this is understood as a guide rail. This guide element serves to guide a function unit that is in particular movable by a motor, and a carrier that can be coupled to the function unit.

The function unit and the carrier are consequently both guided by the guide element, where the carrier can be coupled to the coupling element or decoupled from it depending on the current function status of the drive unit. In the decoupled state, the functional element can be moved separately.

A generic system is already known from DE 10 2009 041 903 B3. With that system, it is provided that the carrier is moved together with the function unit in the said coupled state. It can however also be decoupled from the function unit and then engaged in the guide element instead. For this purpose, a receptacle is provided on the guide element. To facilitate coupling with the function unit on the one hand and for engagement with the guide element on the other hand, the carrier is provided with a coupling element which in an engaged state is arranged in the receptacle of the guide element and in a coupled state is arranged in a recess of the function unit.

This arrangement allows an assembly provided on the carrier, for example the cover of a roof system, to be moved together with the function unit depending on the case, or to remain fixed in the guide element independently of the movement of the function unit. In the aforementioned engaged state, the coupling element is pressed by the force of a spring into the receptacle of the guide element to prevent movement of the carrier along the guide element. It has however been found that this effect by the coupling element and the spring force is sometimes insufficient, for example in the case of an attempt at improper manual displacement of the carrier.

The aforementioned DE 10 2009 041 903 B3 also discloses that the function unit can be used with two carriers which can each be coupled to the function unit via a coupling part. This enables two assemblies to be moved independently of one another by means of the same driven function unit. However, this is a relatively expensive arrangement in view of the comparatively complex structure of the carrier with spring-mounted coupling element.

OBJECT AND SOLUTION

One object of the present invention is to provide a design of the drive unit in which a safe engaged state is achieved.

A further object of the invention is to develop a generic drive unit such that two assemblies, in particular a roller blind-like or plate-like shading means and a cover, are independently movable with less effort.

According to a first aspect of the invention, the carrier comprises a coupling element in the aforementioned manner, said coupling element being movable relative to a main body of the carrier, so that to bring about an engaged state it can be arranged in a first position inside a receptacle of the guide element in order to fix the carrier on the guide element, and to bring about a coupled state it can be arranged in a second position inside a recess of the function unit so that the carrier can be moved together with the function unit. The carrier has a securing element that is movable relative to the main body of the carrier and which, in a fixing position, prevents movement of the coupling part out of the first position.

As already mentioned at the outset, the guide element of a drive unit in accordance with the invention is an element which permits guiding of the function unit and the carrier along a specified path. This is usually a guide rail with a guide channel into which the function unit and the carrier are placed. The carrier represents a component connectable to the function unit by coupling when required and which can be used as a carrier for further assemblies such as a shading means, for example the retractable rod of a roller blind system, or a cover that closes a roof opening.

The coupling element which, in accordance with the invention, is provided as part of the carrier is movable relative to it to a limited degree. It can adopt the aforementioned first position in which it is positioned relative to the carrier main body functioning as a connecting unit such that it is arranged in the receptacle of the guide element. At those points of the guide element where no such receptacle is provided, the coupling element assumes the second position relative to the main body of the carrier, this second position being provided in a coupled state inside the recess of the function unit such that the function unit can move the carrier bidirectionally.

For the carrier to be movable relative to the guide element, the coupling element must therefore leave the receptacle of the guide element. To ensure that this does not happen inadvertently or improperly, but only when the carrier is coupled to the function unit, the securing element in accordance with the invention is provided. In its fixing position, this assumes a position in which the coupling element is arranged relative to the main body of the carrier when it is in its second position. When the securing element is in this fixing position, it thus prevents the coupling element from assuming its second position.

The securing element acts preferably in addition to a first spring that subjects the coupling element to a force to press it into the receptacle. This first spring is preferably in the form of a spring bar that connects the coupling element to the main body of the carrier.

It is considered to be of particular advantage if the securing element too is continually subjected to the force of a second spring in the direction of the fixing position. This brings about an automatic action by which the securing element directly adopts its fixing position when the coupling element is moved inside the receptacle from a second position into its first position and if the function unit is moved in such a way that it no longer prevents displacement of the securing element into its fixing position. The securing element is thus designed for securing such that after the steps required in any case to decouple the function unit from the carrier, no further measures are necessary to bring about a secured state in which the coupling element is arranged in its fixing position.

The first spring and/or the second spring are preferably a leaf spring of plastic or metal. It is considered to be advantageous for the second spring to be a leaf spring, and arranged such that the movement of the coupling element from its first position into its second position is in a direction that lies at least approximately (+/−20°) in the plane of the leaf spring. As a result of this, it is particularly difficult to move the coupling element into its second position if this is already occupied by the securing element arranged in the fixing position.

It is considered to be particularly advantageous if the first spring and the second spring are parts of a single spring. A single-part spring of this type is particularly inexpensive to manufacture. With a further-simplified variant, both the main section of the carrier and the two springs together form a single part. This single part can comprise both the coupling element and/or the securing element itself.

To end the secured state, the securing element must be moved out of a fixing position to allow movement of the coupling element into its second position. This is preferably achieved in that the securing element has a function region that is arranged such that in the course of coupling the function unit comes into contact with this function region and as a result pushes the securing element out of a fixing position. The function region of the securing element is for that purpose preferably designed as a sliding surface inclined at an angle to the direction of movement of the function unit. When the function unit approaches the engaged carrier, it comes into contact with the function region and consequently deflects it. The coupling element can then adopt its second position, where it is preferably provided that the lifting of the coupling element out of the receptacle of the guide element is brought about by the approach of the function unit to the carrier. The approach movement of the function unit to the carrier thus initially brings about a movement of the securing element and then a movement of the coupling element. After ending of the engaged state of the coupling element, the latter is coupled to the function unit.

The invention further relates to a generic drive unit which is further designed such that in addition to the carrier, a push unit guided by the guide element is provided and that the function unit and the push unit each have contact surfaces so that the push unit can be pushed by the function unit in the guide element.

Both the function unit and the push unit are of particularly simple design in terms of their contact surfaces. The contact surfaces only permit the introduction of a push force into the push unit through the function unit. Unlike with carrier, however, it is not provided that the function unit can exert a pull force on the push unit. The function unit and the push unit can therefore be very simply designed in respect of their sides facing one another.

A drive unit of this type is intended for use in a system in which the push unit itself or an assembly provided on the push unit is continuously subjected to a force in one direction, i.e. towards the function unit, on the basis of a different mechanism, preferably a spring force provided for this purpose. The push unit can also be moved bidirectionally by the function unit. A movement counter to the spring force is brought about by the application of force on the push unit by the function unit. A movement in the opposite direction is brought about by the spring force, with the movement of the push unit then being limited by the function unit. The push unit and the carrier are preferably provided on opposite sides of the function unit.

To permit a movement of the function unit without a simultaneous movement of the push unit brought about by the aforementioned spring force, the guide element and the push unit are preferably matched to one another in such a way that a movement of the push unit is only possible up to a defined position along the guide element. This is achieved by the provision of a stop means which is stationary relative to the guide element and which limits the freedom of movement of the push unit in one direction. If the push unit is pushed against the function unit by the aforementioned spring force, and this function unit is moved, then this leads to a joint movement until the push unit reaches the aforementioned stop means. A continued movement of the function unit will then not lead to a continued movement of the push unit.

For both of the aforementioned variants of the invention, it is considered to be advantageous if the function unit can be moved by a cable. This cable is preferably designed in such a way that both push forces and pull forces can be transmitted. For this purpose, it can be routed in particular in one channel of the guide element. In a particularly advantageous embodiment, the cable is designed in one piece with the function unit. This reduces the design work required.

The invention furthermore relates to a system having at least one shading means and/or at least one cover, together with at least one drive unit to move the at least one shading means and/or at least one cover. The drive unit is designed as described above.

The cover is preferably a rigid component which is at least partly translucent and which is suitable to cover a roof opening or window opening. In particular it may be the cover of a roof system. The shading means is preferably a component used to provide shade, such as a shading roller blind that can be stretched over a window opening to provide shade. A system in accordance with the invention preferably has both a cover and a shading means, so that with the example of a roof opening there is the possibility to close it in an airtight manner by means of the cover and to reduce the passage of light through this opening via the shading means.

It is considered to be particularly advantageous if in the case of the above-mentioned second variant of the invention the at least one shading means or the at least one cover is fastened on the push unit, so that a movement of the push unit also brings about a movement of the shading means or cover, and if a displacement spring is additionally provided which exerts a continuous displacement force on the push unit, with this displacement force being directed in the direction of the function unit. The drive unit described above can therefore be used with a push unit that is directly displaced by the function unit in only one direction and is moved in the other direction by means of the spring force of the displacement spring, in so far as the function unit permits.

It is of particular advantage if the shading means is fastened on the push unit and the cover is fastened on the carrier. As a result, the spring force already provided for many shading systems, in particular roller blind systems, can be used to exert force continuously in order to press the shading means against the push unit.

A system in accordance with the invention can be in the form of roof system, in particular of the above-mentioned type. These systems include lifting roof systems, multiple-cover roof systems, tilt-and-slide roof systems and spoiler roof systems. In principle, other applications are also conceivable, such as the use of the system as a window opening system. With a window opening system of this type, the sheet closing the window opening is preferably secured to the carrier, whilst the shading means, which is for example designed as a roller blind system or system with a displaceable plate, is fastened to the push unit.

BRIEF DESCRIPTION OF THE DRAWINGS

Further features and advantages of the invention result from the claims and from the following description of two embodiments of the invention which show the two invention variants. The figures show in:

FIG. 1 a drive unit according to the second variant of the invention,

DETAILED DESCRIPTION OF ONE EMBODIMENT

Figures 2A, 2B, 2C:
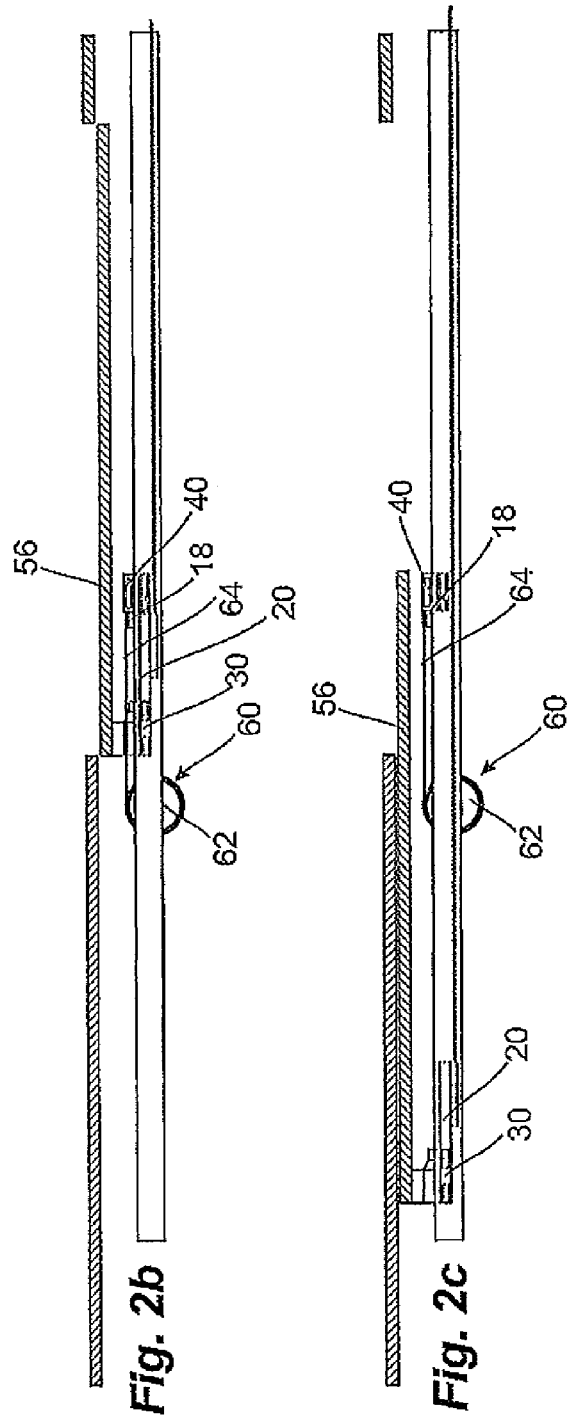
FIGS. 2a to 2c a roof system using the drive unit of FIG. 1.

FIG. 1 shows a first drive unit in accordance with the invention. This comprises as the main components a guide rail 10, in which a guide block 12 is provided. Three components together forming an actuation unit are guided movably along the guide block 12 in a longitudinal direction 2. These components are a function unit 20, a carrier 30 and a push unit 40. The function unit 20 can be moved bidirectionally in the guide block 12 in the direction 2 by means of a motor, not shown, and a drive cable 22. The function unit 20 and the carrier 30 are here designed such that they can be coupled to one another. For this purpose, the function unit 20 has a recess 24 which can accommodate a coupling element 34 of the carrier 30. The coupling element 34 is connected to a main body 32 of the carrier 30 by a leaf spring 36. This leaf spring is designed such that it continuously exerts a force on the coupling element 34 outwardly in the direction of the arrow 4. In the coupled state shown in FIG. 1, this spring force of the leaf spring 36 cannot lead to a decoupling since the coupling element 34 is prevented from leaving the recess 24 of the function unit by an edge 14 of the guide element 10. A receptacle 16 is provided in the guide element for decoupling of the carrier 30 from the function unit 20. As soon as the function unit 20 moves from the position shown in FIG. 1 in the direction of the arrow 2a, the carrier 30 is drawn along until the coupling element 34 is disposed at the level of the receptacle 16. The coupling element 34 is then pressed into the receptacle 16 by the spring force of the leaf spring 36 and as a result is decoupled from the function unit 20. Following this decoupling, as soon as the function unit 20 moves back in the direction of the arrow 2b towards the carrier 30, then the coupling element 34 is pressed out of the receptacle 16 again and is pressed into the recess 24 in the course of the approach through a guide surface not shown in FIG. 1. This ensures that, relative to the perspective of FIG. 1, the carrier is always coupled to the function unit 20 if it is arranged on the left-hand side of the receptacle 16. To the right, however, the carrier cannot remain coupled to the function unit 20 beyond the receptacle 16.

The push unit 40 is provided on the right-hand side of the function unit 20. This push unit is continuously subjected to the force of a spring 99 in the direction of the arrow 2b, as explained below. The end position shown in FIG. 1 is not however overrun by the push unit 40, since the guide rail 10 has a stop 18, which can be overcome by the function unit 20 but not by the push unit 40. If however the function unit 20 is moved to the right, past the stop 18, then a contact surface 26 of the function unit 20 facing the push unit comes into contact with a corresponding contact surface 42 of the push unit 40, so that a continued movement of the function unit 20 to the right in the direction of the arrow 2a brings about a movement of the push unit 40 too in the same direction.

FIGS. 2a, 2b and 2c illustrate the use of the drive unit of FIG. 1. The figures show a roof system 50, comprising a vehicle roof 52 with a roof opening 54. A cover 56 of a material that transmits light, for example Plexiglas, is provided to close this roof opening 54. In the state shown in FIG. 2a, this is arranged such that it completely closes the roof opening 54. A shading unit 60 is arranged below the cover 56 and comprises a roller blind shaft 62 and a roller blind web 64. The roller blind shaft 62 is here continuously subjected to the force of a helical spring, not shown, in the winding direction. Alternatively, a shading unit 60 with a rigid plate subjected to a spring force towards the left may be used.

The cover 56 in this example embodiment is permanently connected to the carrier 30. A complete connection here is however a simplified special case. With variants of the arrangement, it may also be provided for the coupling between the carrier 30 and the cover 56 to be solely in the direction 2, but for there also to be a degree of freedom of the cover 56 by which it is elevated with respect to the position shown in the state shown in FIG. 2a, so that it is aligned flush with the surrounding roof 52. The distal end of the roller blind 64 is connected to the push unit 40.

The configuration illustrated and described leads to the functionality described below. Starting from the state in FIG. 2a, in which the roof opening 54 is closed by the cover 56 on the one hand and has the roller blind web 64 stretched across it on the other hand, a movement of the function unit 20 in the direction of the arrow 2b results initially in the shading means 64 being moved. When the function unit 20 is moved in the direction 2b, the push unit 40 follows it as a result of the force of the helical spring of the winding shaft 62, so that initially the shading means 64 uncovers the window opening 54 to a major degree during a transition from the state in FIG. 2a to the state in FIG. 2b. The movement of the roller blind web 64 ends when the push unit 40 reaches the stop 18. From this point onwards, any continued movement of the push unit 40 in the direction of the arrow 2b is not possible. However, a continued movement of the function unit 20 in the direction of the arrow 2b leads to a coupling to the carrier 30, as explained in relation to FIG. 1. As a result of this coupling, the continued movement of the function unit 20 will lead to a movement of the cover 56 until the state shown in FIG. 2c is reached. In this state, the roof opening is completely open. The return to the state shown in FIG. 2a is achieved by a movement of the function unit in the direction of the arrow 2a. Due to the coupling of the carrier 30 to the function unit 20, also suitable for pull forces, the cover 56 is first returned to its position shown in FIGS. 2a and 2b, and in this position is decoupled from the function unit 20. In the case of a continued movement of the function unit 20 in the direction of the arrow 2a, the function unit 20 comes back into contact with the push unit 40 and moves it in the direction of the arrow 2a until the state shown in FIG. 2a is reached. The shading means 64 is then unwound again from the winding shaft 62.

The system thus permits, with just one driven function unit, a sequential movement of the shading means 64 and the cover 56. By means of adaptation or movement of the receptacle 16 and/or the stop 18 it is possible for the movements to overlap in time.

Figure 3A:
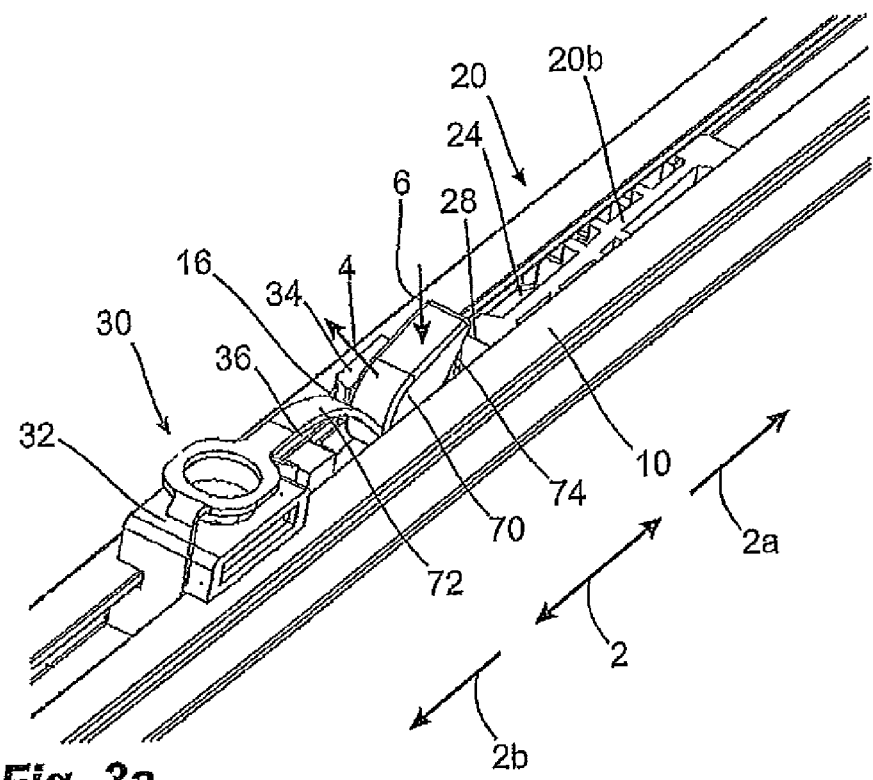
FIGS. 3a and 3b a drive unit according to the first variant of the invention and FIGS. 4a to 4d the mode of operation of the first variant of the invention.
Figure 3B:
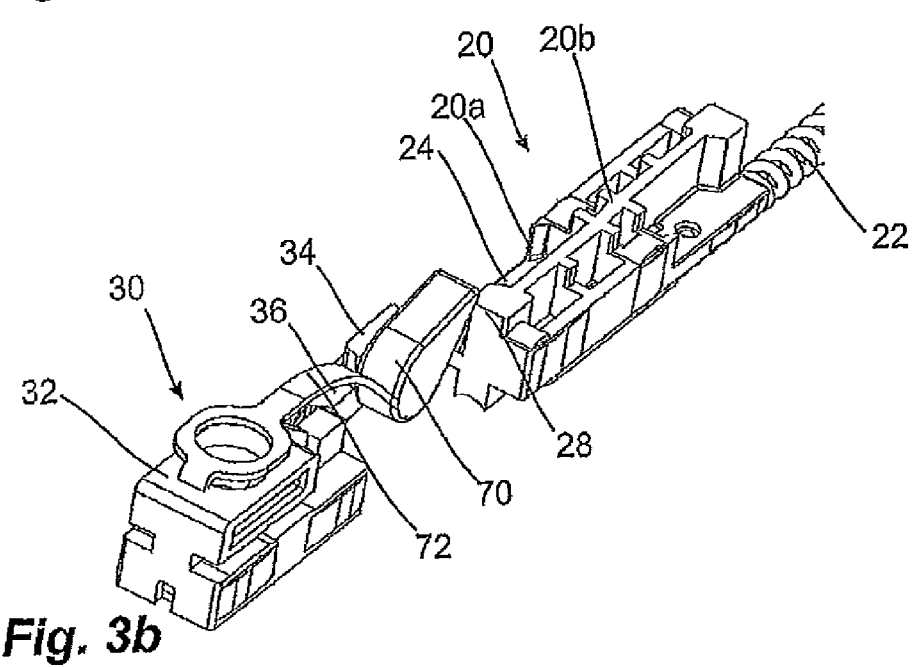

FIGS. 3a and 3b illustrate an example embodiment of the first variant of the present invention, where in FIG. 3b the guide element 10 is omitted. The drive unit as shown in FIG. 3a again has a guide element 10 with a guide groove 12. A carrier 30 and a function unit 40 are guided by the guide groove 12. They can be coupled to one another, with this taking place in the same manner as already described for FIG. 1. Here too, a main section 32 of the carrier is connected to a coupling element 34 of the carrier via a leaf spring 36 that always exerts a force on the coupling element 34 in the direction of the arrow 4. With this arrangement too, the function unit 20 has a recess 24 in which the coupling element 34 can engage to bring about a coupled state.

The special feature of the configuration in FIGS. 3a and 3b is the securing element 70. This securing element 70 is, similarly to the coupling element 34, a part of the carrier and is connected to the main body 32 of the carrier by means of a leaf spring 72. This leaf spring 72 presses the securing element 70 downwards in the direction of the arrow 6 up to the position which the securing element 70 adopts in FIG. 3b. FIGS. 3a and 3b illustrate the fixing position of the securing element 70. In this fixing position, the securing element 70 is arranged such that the coupling element 34 cannot be moved against the direction of the arrow 4, since the securing element 70 is in the way. If the carrier 30 is then located in a receptacle 16 of the guide element 10, then this engaged state is ensured not only by the spring force acting on the coupling element 34, but also by the securing element 70. Separation of the carrier 30 from the guide element 10 is here again made markedly more difficult, so that an improved functional reliability is achieved.

To end the engaged state and instead to couple the carrier 30 to the function unit 20, it is provided, similarly to the configuration shown in FIG. 1, that this can be achieved by moving the function unit 20 close to the carrier. The carrier 30 and the function unit 20 are matched to one another for this purpose such that a movement of the function unit 20 in the direction of the arrow 2b initially leads to a contact between a function surface 74 of the securing element 70 and a lifting edge 28 of the function unit 20. As a result, the securing element 70 is lifted until it again permits movement of the coupling element 34. This movement of the coupling element 34 into the recess 24 of the function unit 20 is then caused by the guide surface 20a provided on the function unit 20.

FIGS. 4a to 4d illustrate the transition from the engaged state of the carrier 30 to the disengaged and coupled state. The arrangement in FIGS. 4a and 4d differs marginally from that in FIGS. 3a and 3b. All of the component parts important for the invention are however provided in the same or an equivalent form. The carrier 30 in the state shown in FIG. 4a is in an engaged state. The coupling element 34 is located inside the receptacle 16 of the guide element 10. As shown in FIG. 4b, the movement of the function unit 20 in the direction of the arrow 2b leads to the lifting edge 28 coming into contact with the securing element 70. This occurs, as is clear from the lower illustration of FIG. 4b, markedly before the recess 24 is at the level of the receptacle 16 and the coupling element 34 arranged therein. As is clear from FIG. 4c, during continued movement of the function unit 20 in the direction of the arrow 2b, the securing element 70 is lifted substantially until it is resting on an upper side 20b of the function unit 20. This state is achieved in FIG. 4c. The further continued movement of the function unit 20 results in the guide surface 20a coming into contact with the coupling element 34 so that it is lifted out of the receptacle 16 and thereby pressed into the recess 24. The securing element 70 is at this point in time in a position in which it no longer prevents this movement of the coupling element 34.

The decoupling process occurs in reverse sequence, not shown in detail. As soon as the function unit 20 with the coupled carrier 30 is moved past the receptacle 16, the coupling element 34 is pressed by the spring 36 back into the receptacle 16, so that engagement and cessation of movement of the carrier 30 are brought about. Through this cessation of movement during continued movement of the function unit 20, the securing element 70 slides down again and thereby blocks the coupling element in the receptacle 16. The engaged and secured state is restored again.

The invention claimed is:

1. A drive unit for a motor vehicle comprising:
a guide element;
a function unit that is guided by the guide element; and
a carrier that is guided by the guide element and releasably coupled to the function unit; wherein
the carrier comprises a coupling element moveable relative to a main body of the carrier:
to bring about an engaged state when the coupling element is arranged in a first position inside a receptacle of the guide element to thereby secure the carrier to the guide element, and
to bring about a coupled state when the coupling element is arranged in a second position inside a recess of the function unit such that the carrier is moved together with the function unit; and
the carrier has a securing element which is movable relative to the main body of the carrier and which in a fixing position prevents movement of the coupling element from the first position into the second position.

2. The drive unit according to claim 1, wherein:
the coupling element is continuously subjected to force of a first spring acting in a direction of entry into the receptacle of the guide element.

3. The drive unit according to claim 2, wherein:
the securing element is continuously subjected to force of a second spring in a direction of the fixing position.

4. The drive unit according to claim 3, wherein:
the first spring and the second spring are parts of a single spring.

5. The drive unit according to claim 1, wherein:
the securing element has a function region that is arranged such that in a course of coupling the function unit comes into contact with the function region and as a result pushes the securing element out of the fixing position.

6. The drive unit according to claim 1, further comprising:
a push unit guided by the guide element;
wherein the function unit and the push unit both have a contact surface so that the push unit is moveable inside the guide element by the function unit.

7. The drive unit according to claim 6, wherein:
the push unit is provided on a side of the function unit opposite the carrier.

8. The drive unit according to claim 6, wherein:
the guide element and the push unit are matched to one another in such a way that movement of the push unit is only possible up to a defined position.

9. The drive unit according to claim 1, further including:
a cable for moving the function unit.

10. A system comprising at least one shades and/or at least one cover and at least one drive unit for moving the at least one shade and/or the at least one cover;
the drive unit comprising:
a guide element;
a function unit that is guided by the guide element; and
a carrier that is guided by the guide element and coupleable to the function unit;
wherein the carrier comprises a coupling element moveable relative to a main body of the carrier:
to bring about an engaged state when the coupling element is arranged in a first position inside a receptacle of the guide element to secure the carrier to the guide element, and
to bring about a coupled state when the coupling element is arranged in a second position inside a recess of the function unit such that the carrier is moved together with the function unit; and wherein the carrier has a securing element which is movable relative to the main body of the carrier and which in a fixing position prevents movement of the coupling element from the first position into the second position.

11. The system according to claim 10, wherein:

the at least one shade or the at least one cover is fastened to a push unit so that a movement of the push unit also causes a movement of the at least one shade or of the at least one cover; and a displacement spring is provided which exerts a continuous displacement force on the push unit, with the displacement force being directed in a direction of the function unit.

12. The system according to claim 11, wherein:

the at least one shade is moveable between an open position and a closed position and is connected to the push unit in such a way that a force of the displacement spring presses the at least one shade in a direction of the open position.

13. The system according to claim 11, wherein:

the at least one shade is fastened to the push unit and the at least one cover is fastened to the carrier.

14. The system according to claim 11, wherein:

the system is designed as a window opener system.

* * * * *